(12) United States Patent
MacKelvie

(10) Patent No.: US 6,553,869 B1
(45) Date of Patent: Apr. 29, 2003

(54) METHOD OF FORMING A TOOTHED CUTTING BLADE

(75) Inventor: Winston R. MacKelvie, Knowlton (CA)

(73) Assignee: Ray Arbesman, Toronto (CA)

( * ) Notice: Subject to any disclaimer, the term of this patent is extended or adjusted under 35 U.S.C. 154(b) by 0 days.

(21) Appl. No.: 09/297,670

(22) PCT Filed: Nov. 6, 1997

(86) PCT No.: PCT/CA97/00871
§ 371 (c)(1),
(2), (4) Date: May 6, 1999

(87) PCT Pub. No.: WO98/19816
PCT Pub. Date: May 14, 1998

(30) Foreign Application Priority Data

Nov. 6, 1997 (GB) .................................... 9623104

(51) Int. Cl.[7] ............................................. B23D 63/04
(52) U.S. Cl. ...................................... 76/112; 76/29
(58) Field of Search ........................... 76/112, 58, 29

(56) References Cited

U.S. PATENT DOCUMENTS

| | | | | |
|---|---|---|---|---|
| 1,143,934 A | * | 6/1915 | Begg .......................... | 83/661 |
| 2,394,326 A | * | 2/1946 | Newnham .................... | 76/112 |
| 2,451,759 A | * | 10/1948 | Maurer ........................ | 76/72 |
| 3,208,310 A | * | 9/1965 | Dunn .......................... | 76/112 |
| 4,019,408 A | * | 4/1977 | Idel ............................. | 76/112 |
| 4,023,448 A | * | 5/1977 | Bertini ........................ | 76/112 |
| 4,232,578 A | * | 11/1980 | Stellinger et al. ............ | 76/112 |
| 4,578,984 A | * | 4/1986 | Bohman ...................... | 76/112 |
| 4,589,306 A | * | 5/1986 | Danielsson .................. | 76/112 |

FOREIGN PATENT DOCUMENTS

| FR | 1439689 | * | 4/1966 |
|---|---|---|---|
| GB | 856252 | * | 12/1960 |

* cited by examiner

Primary Examiner—Kenneth E. Peterson
Assistant Examiner—Omar Flores-Sánchez
(74) Attorney, Agent, or Firm—Moser, Patterson & Sheridan, L.L.P.

(57) ABSTRACT

Toothed cutting blades are made by forming spaced slots in an edge of a blade preform (20) to leave lands (8) between leading and trailing walls (4, 6) defining the slots, the leading walls (4) having a rake angle greater than that required in the finished blade, and the lands having aligned top surfaces between the slots, and then applying bending forces to the lands (8) so as to reduce the rake angle of the front walls to that desired and incline the top surfaces to form positively raked teeth with inclined back surfaces (32). The lands may be bent by tools inserted in the slots, or by compressing their material between punches applied adjacent their front walls.

4 Claims, 2 Drawing Sheets

METHOD OF FORMING A TOOTHED CUTTING BLADE

This invention relates to the manufacture of toothed cutting blades, such as saw blades for band, hand or reciprocating saws, and blades for use in the surface modification technique described in U.S. Pat. No. 5,376,410 (MacKelvie).

Such blades are commonly formed by machining or punching tooth forms in the edge of a strip of suitable material such as tool steel, the resulting tooth forms then being subjected to finishing operations such as setting, hardening and sharpening. Tooth forms are selected according to the intended use of the blade. One characteristic which influences the cutting characteristics of the blade is the rake angle of the teeth. A positive rake angle favours aggressive cutting characteristics, while the planing characteristics desirable on the teeth of blades used in the technique of U.S. Pat. No. 5,376,410 call for a substantial positive rake angle together with control of surface penetration. Unfortunately, severely raked teeth formed by the conventional forming process tend to be structurally weak.

According to the present invention, a method of forming a toothed cutting blade comprises forming spaced slots in an edge of a blade preform to leave lands between leading and trailing walls defining the slots, at least the leading walls of the lands having a positive rake angle greater than that required in the finished blade, and the lands having aligned top surfaces between the slots, and then applying bending forces to at least selected lands such as to reduce the rake angle of their leading walls to a desired angle and to project their top surfaces adjacent the leading walls beyond said edge to form positively raked teeth with inclined back surfaces.

The slots in the edge of the blade preform may conveniently be produced by forming a row of apertures in a sheet of material, and cutting the sheet along a line intersecting the apertures in the row to leave a preform edge with slots of desired profile.

Further features of the invention will be apparent from the following description with reference to the accompanying drawings, in which.

Figure 1:
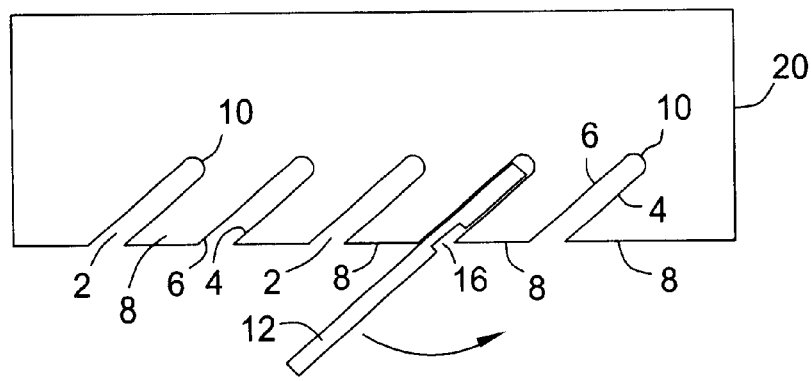
FIG. 1 illustrates an edge slotted preform for producing a tooth blade, together with a tool for bending lands between the slots.
Figure 2:
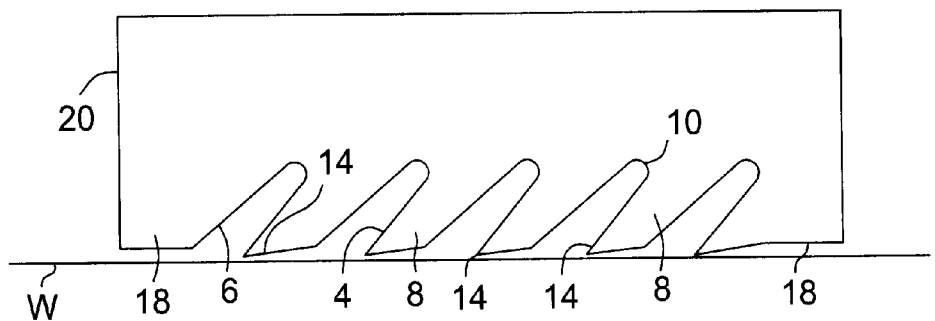
FIG. 2 illustrates the preform after bending of the lands to form teeth.

Referring to FIG. 1, a blade blank 20 is shown formed with a row of equally spaced inclined slots 2. Conveniently, such a blank may be formed by punching a row of double length closed slots down the midline of a strip of material, and cutting it along the midline, in the same basic manner as is described in more detail with reference to FIG. 3. The slots 2 define leading and trailing walls 4, 6 of lands 8 whose top surface are aligned with the edge of the blank. The bottoms 10 of the slots will form gullets in the finished blade. Preferably the strip is cut from steel, normally tool steel in such a manner that the grain direction of the steel is generally parallel to the direction of the leading edge of the lands 8.

Figure 3:
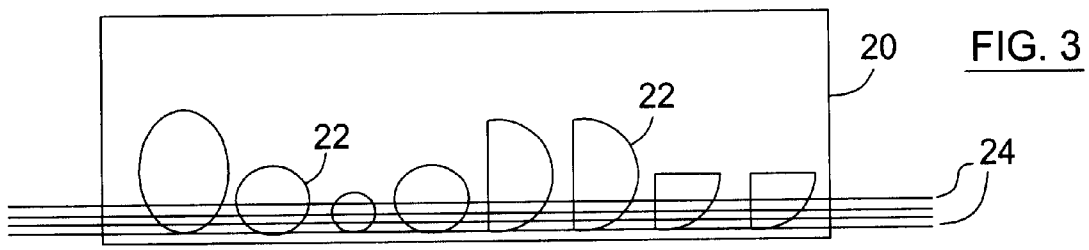
FIG. 3 illustrates schematically how a sheet of material may be cut through a row of apertures to form lands of different profiles.

By use of a tool such as that shown at 12, the lands 8 are bent to form teeth as shown in FIG. 3. The inclination of the walls 4 in the blank exceeds the rake required in the finished teeth, so that the required rake is obtained after bending. The bending also raises cutting edges 14 of the tooth, and inclines the adjacent portion of the lands 8 so that the teeth project a controlled distance beyond the edge of the blank, thus controlling the cutting depth of the teeth when the blade engages a workpiece W. Thereafter the teeth can be set, hardened and sharpened as required to provide a finished blade. Certain lands or land portions 18 may be left undistorted during the bending process so as to provide further control of cutting depth, although experience shows that this may not be desirable, particularly if it is desired that the cuts made by adjacent teeth should overlap. Thus in implementing the technique of the above referenced U.S. patent, a limited overlap between the cuts made by adjacent teeth may be desirable, and the absence of portions 18 will help permit cuts which overlap without resulting in severing of the cuttings which are formed.

It will be noted that the bending tool 12 may be provided with a clearance 16 so that it does not bear directly on the cutting edges during the bending step. Depending on the profile of the slots 4, it may also be desirable to insert a temporary bearing block into the slot to provide a fulcrum on which the bending tool may act during the bending step, which is optimally positioned and spreads the loads developed at the fulcrum to avoid distortion of the blank in areas where such distortion is not desired.

The amount of bending of the lands to form the teeth determines both the depth of cut, according to the amount that the edges 14 are raised relative to the original alignment of the tops of the lands 8, and also the final rake of the teeth, which of course will be less than the initial rake angle of the walls 4 by the angle of rotation of the lands during bending to form the teeth. Starting for example with a blank 20 of tool steel 0.75 mm thick, with lands 8 which are 1.5 mm wide between the slots 2 which are also 1.5 mm wide and 3.4 mm deep, the slots initially extending at 45° to the edge of the blank, the cutting depth and final rake may readily be determined for any defined bending movement based on the extent of this movement and the depth of the slots. Thus cutting.depth may be very accurately controlled to as little as 0.1 mm or as much as 1 mm simply by controlling the bending process.

Depending on the configuration of the slot, the bending tool 12 may be replaced by tapered punches forced into the recesses or by cams inserted into the recesses and rotated, in place of the lever shown. In such cases, if the lands are narrow, and depending on the slot configuration appropriate supports may be needed for adjacent portions of the blank to localize distortion of the blank to the desired areas. Another technique to bend the lands involves pressing or impacting the trailing end of the upper surface of the land so as to bend up its leading end.

Figure 4:
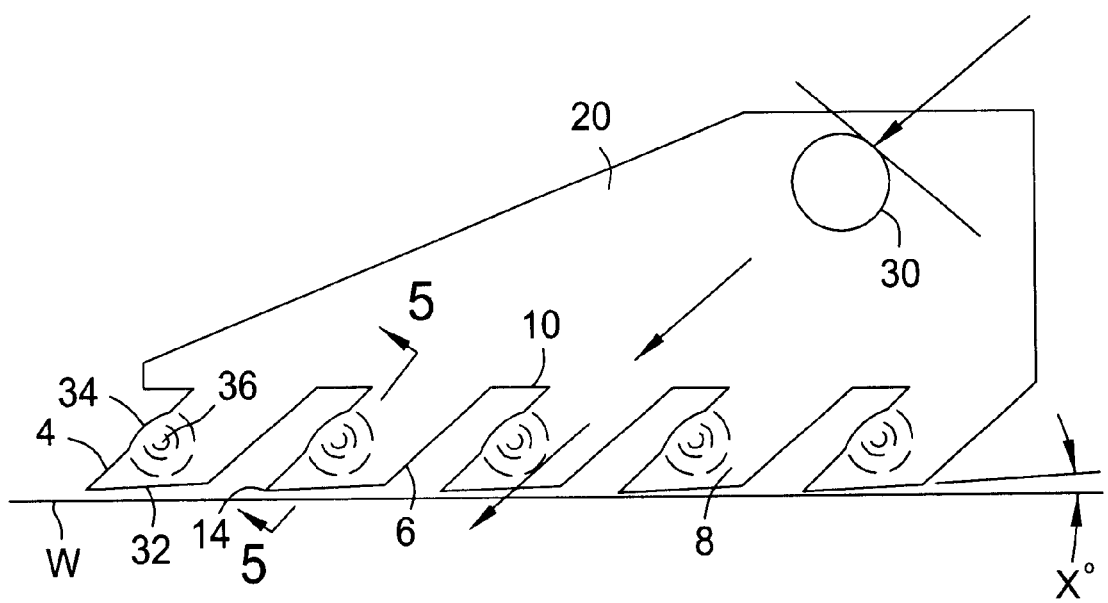
FIG. 4 shows a blade illustrating a presently preferred technique for bending the lands.
Figure 5:
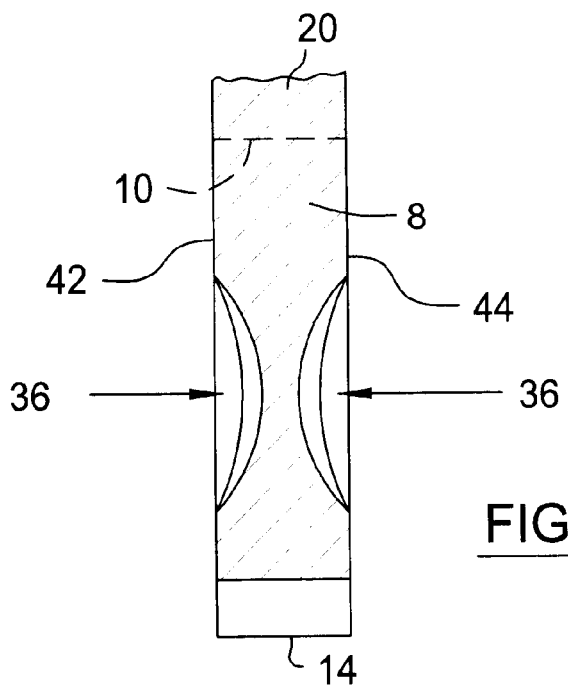
FIG. 5 is an enlarged fragmentary cross-section on the line 5—5 in FIG. 4.

A presently preferred method of bending the lands is illustrated in FIGS. 4 and 5, showing an exemplary blade designed for implementing the technique of U.S. Pat. No. 5,376,410. Parts corresponding to those shown in FIG. 1 are designated by the same numbers. The blade is designed to be operated during a cutting stroke by an activating force applied in the direction shown by the arrows, in this case about 45° to surface of the workpiece W, for example by an actuator (not shown) acting through an aperture 30 in the blade 20. The grain direction of the steel of the blade preferably also extends in this direction.

As best illustrated by FIG. 5, oppositely acting punches, round headed in the example shown, are applied to opposite sides of the land (first face 42 and second face 44) closer to its front wall 4 than its trailing wall 6 so as to compress and displace the metal of the land at locations 36 and thus bend the land so as to incline the outer end surface 32 of the land 8 to form an inclined surface 32 at an angle x to the workpiece, and to somewhat decrease the rake angle of the distal portion of the wall 4.

In the example shown, the punching action also produces a bulge 34 in the leading wall 4 of each land. The position of application of the punches may be adjusted according to the bending effect desired, both towards or away from the base of the land 8, or towards or away from the leading edge 4. If the punches are applied adjacent the base of the land, the bulge 34 may not be apparent.

Figure 6:
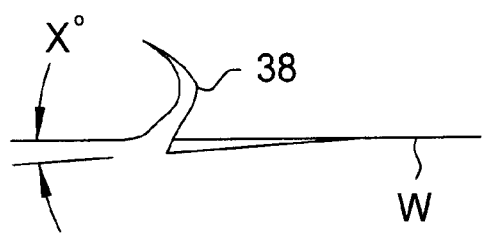
FIG. 6 illustrates the shaving produced by a blade formed as illustrated in FIG. 4.

FIG. 6 shows a shaving 38 created by the action of the cutting edge 14. The taper of the shaving or tongue is controlled by the angle x° of the surface 32.

Formation of blade blanks 20 is further illustrated in FIG. 3, which shows exemplary forms of aperture 22 which may be selected for formation in a strip of material used to form the tool blank. The apertures 22 are of different shapes and sizes for illustrative purposes only, and such assorted shapes would not occur in an actual blank. However, varying sizes and forms of aperture may be used to provide blanks whose differing lands may be converted to teeth with differing tooth configuration. The lines 24 illustrate how slots with walls of different rakes may be formed by adjusting the position of a cut made to form the edge of the tool blank 20 when the apertures have a curved profile intersecting the cut line on at least one side. The apertures 22 may be countersunk from one or both sides to provide V edges on the teeth, and the blank may be formed with a V-section along its slotted edge.

What is claimed is:

1. A method of forming a toothed cutting blade comprising:

(a) forming spaced slots in an edge of a blade perform strip to leave lands between a leading wall and a trailing wall defining the slots, the leading wall defining a cutting edge at the edge of the strip, the cutting edges of the lands defining an axis along the edge of the strip; and (b) applying deformation forces to at least one land, the forces projecting the leading wall of the land transversely to the axis and projecting the cutting edge of the land beyond the edge of the strip to form a cutting tooth, wherein the strip comprises a first face and a second face, the forces being applied perpendicular to the first face and the second face.

2. The method according to claim 1, wherein the forces are applied simultaneously to the first face and the second face.

3. The method according to claim 2, wherein the forces are applied substantially opposite each other on the first face and the second face.

4. The method according to claim 3, wherein each slot defines a gullet, the forces being applied to the first face and the second face at positions on the land proximate to the gullet of an adjacent slot.

* * * * *

UNITED STATES PATENT AND TRADEMARK OFFICE
CERTIFICATE OF CORRECTION

PATENT NO.    : 6,553,869 B1
DATED         : April 29, 2003
INVENTOR(S)   : MacKelvie It is certified that error appears in the above-identified patent and that said Letters Patent is hereby corrected as shown below:

Title page,
Item [30], Foreign Application Priority Data, please change "Nov. 6, 1997" to -- Nov. 6, 1996 --.

Signed and Sealed this

Sixteenth Day of September, 2003

JAMES E. ROGAN
*Director of the United States Patent and Trademark Office*